Nov. 14, 1967  A. H. CRAWFORD  3,352,191

DOWEL

Filed April 23, 1965

INVENTOR.
ALLAN H. CRAWFORD
BY Joseph P. Flanagan, Atty.

United States Patent Office 3,352,191
Patented Nov. 14, 1967

3,352,191
DOWEL
Allan H. Crawford, 72 11th Ave.,
Amsterdam, N.Y. 12010
Filed Apr. 23, 1965, Ser. No. 450,393
2 Claims. (Cl. 85—14)

The present invention relates to a device useful in the assembly of furniture and more particularly to a dowel which is simple to manufacture and has a number of useful characteristics not heretofore found in the prior art.

A large number of furniture items have doweled joints and in most instances the usual manner of doweling those joints consist of using a wooden dowel having a relatively smooth exterior surface which fits into recesses in each member to be joined and applying an adhesive such as glue or the like to the dowel surface and/or the surfaces of the items to be joined. Although such practice generally provides good holding results at the time of manufacture, it is a well known fact that such joints have a tendency to fail during protracted use due to the ageing of the glue, drying out of the joint when the items of furniture is exposed to a dry atmosphere, or fracture of the dowel itself. Another serious handicap which I have found in connection with using the conventional wooden dowel and adhesive joint is that such a method of joining does not lend itself to efficient assembly line manufacture of furniture items as discussed below.

It will be appreciated by those skilled in the art that, when a glued joint is formed in the furniture manufacturing art, it is generally necessary to allow the glued item to stand for a period of time, generally in a compressed condition, in order that the adhesive be allowed to set. If the latter procedure is not followed, it frequently happens that the joint will loosen and become deformed as subsequent steps are performed in the assembly of the item.

Such a manner of forming joints does not lend itself to present day assembly line construction of furniture or the like and in an effort to overcome the inherent disadvantage of the glued dowel joint, I have provided my improved dowel as described hereinafter.

It is an object of this invention to provide a dowel useful in forming joints which will perform its holding function consistently and lastingly without regard to the various climatic atmospheres to which it may be exposed.

It is a further object of this invention to provide a dowel which, immediately upon its being positioned in place, is capable of performing its ultimate function of forming a secure joint without the necessity of having to set for any period of time prior to becoming fully operative.

It is a still further object of this invention to provide a dowel which is simple in construction, inexpensive to manufacture, and easy to install affording economy in use of materials and which is efficient in all the functions for which it is designed.

Keeping the above objects in mind, I now proceed to a detailed description of my invention, reference being had to the accompanying drawings forming a part of this application, wherein like reference characters indicate corresponding parts in all views and in which.

Figure 1:
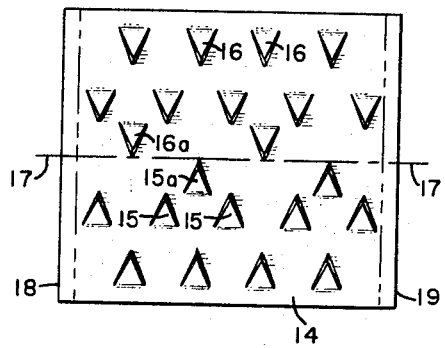
FIGURE 1 is a plan view of the dowel of the present invention in one of its stages of manufacture.
Figure 2:
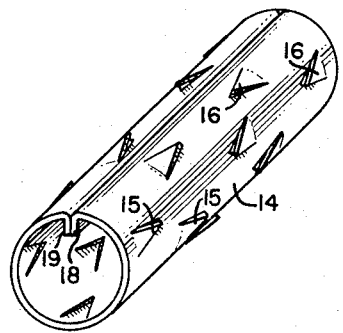
FIGURE 2 is an isometric drawing of the dowel of the instant invention.

In FIGURE 1 is illustrated a blank 14, which may be of any suitable material, prior to its being formed into the generally cylindrical shape of the dowel 12 of FIGURE 2. The blank 14 of FIGURE 1 has two sets of holding projections 15 and 16 projecting at an angle less than the perpendicular therefrom, which projections may be formed on the blank 14 by any desired means, for example by a stamping proces or the like.

All of the projections 15 it will be noted lie on one side of the centerline 17, FIGURE 1, while all of the projections 16 lie on the opposite side of the centerline 17, yet each of the projections 15 and 16 are inclined at an angle toward said centerline.

In addition to the projections 15 and 16 I have provided my dowel with at least two additional locating projections 15a and 16a, each of the latter having its distal end located precisely or nearly so in the plane of the centerline 17. The latter projections serve a purpose described below.

The blank 14, of FIGURE 1, from which my dowel is formed, is not shaped into true cylindrical form in constructing the dowel of FIGURE 2. I have found that if one or more of the ends 18, 19 of the blank are turned inwardly towards the center of the cylinder, as clearly shown in FIGURE 2, certain characteristics are imparted to the dowel as more fully described hereinafter.

Figure 3:
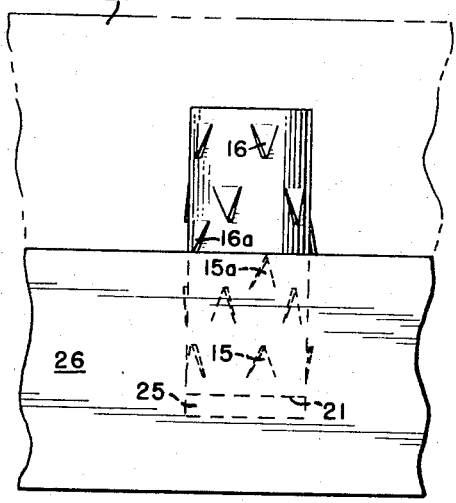
FIGURE 3 is a view showing the dowel of FIGURE 2 securing two members together.

When using the dowel 12 to join two members, one end of the dowel, for example the end 21, is driven into a recess 25 formed in one of the members, for example member 26 of FIGURE 3, to be joined. As the dowel is driven into such member 26 of the projections 15, because of their inclination in a direction opposite to the direction of travel of the dowel, allow free movement of the dowel, the projections 15 being compressed to the extent necessary, until such time as locator projection 16a engages said member 26 at which time travel of the dowel is terminated. The portion of the dowel extending from said first recess is then inserted in a recess formed in the member 27 to be joined to the first member 26 until the two members 26 and 27 abut each other at which time the joint is complete with the holding projections preventing separation of the members 26, 27.

Those persons skilled in the art to which this invention pertains will appreciate the fact that the holes into which dowels are inserted are not always of uniform width or length and this condition oftentimes results in poorly formed joints when using conventional wooden dowels or the like, in that, in the case of a hole of a diameter greater than the dowel there is a tendency for the dowel to fit loosely, while in the case of a hole not drilled to a predetermined depth, it frequently happens that unequal lengths of dowel will be inserted in the members to be joined such the bearing surface of the dowell against each of the members will be unequal, thereby possibly resulting in a less than satisfactory connection.

My dowel overcomes these difficulties by virtue of its unique construction. A certain amount of flexibility imparted to the instant dowel due to the manner in which one or more of the ends 18, 19 are bent inwardly towards the center, as well as the flexibility resulting from the spring action of the projections 15 and 16, serves to render the dowel 14 easily adaptable to joining members that do not have holes of a precise uniform diameter. As for the problem incurred where the holes in the various members may be drilled to a non-uniform depth, it will be appreciated that I have overcome this problem by forming my dowel with the locating projections 15a and 16a which serve to limit the depth to which the dowel can be inserted in any such hole.

As above mentioned, the inwardly directed end or ends 18, 19 impart flexibility to the dowel of the instant invention, yet they also serve a useful purpose in preventing the dowel from collapsing to such an extent that it would be ineffective when the dowel is inserted in an opening in a member to be joined.

Although I have shown and described my dowel as being generally cylindrical in shape, I wish it to be understood that the novel features of construction herein illustrated and described would be equally useful when applied to dowel members of shapes other than that illustrated for example, dowels having a generally rectangular cross sectional area.

Many modifications within the scope of the invention will occur to those skilled in the art. The invention therefore is not limited to the form illustrated and described.

What is claimed is:

1. A one-piece dowel comprising a longitudinally slit tubular shaped, resilient member, said member having a first edge portion along one side of the slit extending at least partially on each side of the transverse centerline of the dowel and projecting substantially radially towards the interior thereof, said first edge portion defining a substantially planar flange for abutting relationship with a second edge portion thereof to block movement of said second edge portion and thereby prevent collapse of the tubular member upon its insertion into an opening in a workpiece, said member having two groups of inclined projections projecting from an outer surface thereof, one group of said projections being confined to one longitudinal half of the member and projecting in a direction toward the end of said member remote from said one half, the other group of said projections being confined to the other half of the member and projecting in a direction toward the other end of said member, said projections having penetrating tips for impinging members to be joined together.

2. A one-piece dowel comprising a longitudinally slit tubular shaped, resilient member, said member having a first edge portion along one side of the slit extending at least partially on each side of the transverse centerline of the dowel and projecting substantially radially towards the interior thereof, said first edge portion defining a substantially planar flange for abutting relationship with a second edge portion and thereby prevent collapse of the tubular member upon its insertion into an opening in a workpiece, said member having two groups of inclined projections projecting from an outer surface thereof, one group of said projections being confined to one longitudinal half of the member and projecting in a direction toward the end of said member remote from said one half, the other group of said projections being confined to the other half of the member and projecting in a direction toward the other end of said member, said projections having penetrating tips for impinging members to be joined together, at least one of said projections having its distal end located at a point between and equidistant or nearly so from said ends to define means for locating the dowel in a pair of holes in members to be joined.

References Cited

UNITED STATES PATENTS

| | | | |
|---|---|---|---|
| 141,810 | 8/1873 | Nichols | 85—11 |
| 624,758 | 5/1899 | Curtin | 85—11 |
| 825,069 | 7/1906 | Peirce | 85—14 |
| 1,354,549 | 10/1920 | Gilmer | 85—14 |
| 1,993,965 | 3/1935 | Huck et al. | 138—128 |
| 2,972,275 | 2/1961 | Baubles | 85—8.3 |

FOREIGN PATENTS

| | | |
|---|---|---|
| 444,883 | 5/1927 | Germany. |
| 974,115 | 11/1964 | Great Britain. |

CARL W. TOMLIN, *Primary Examiner.*

R. S. BRITT, *Assistant Examiner.*